US012430174B2

(12) United States Patent
Rhodes

(10) Patent No.: US 12,430,174 B2
(45) Date of Patent: Sep. 30, 2025

(54) SYSTEMS AND METHODS FOR MEMORY MANAGEMENT IN BIG DATA APPLICATIONS

(71) Applicant: YAHOO ASSETS LLC, New York, NY (US)

(72) Inventor: N. Lee Rhodes, Los Altos, CA (US)

(73) Assignee: YAHOO ASSETS LLC, New York, NY (US)

( * ) Notice: Subject to any disclaimer, the term of this patent is extended or adjusted under 35 U.S.C. 154(b) by 560 days.

(21) Appl. No.: 17/412,548

(22) Filed: Aug. 26, 2021

(65) Prior Publication Data
US 2023/0060922 A1 Mar. 2, 2023

(51) Int. Cl.
G06F 9/50 (2006.01)
(52) U.S. Cl.
CPC .................. G06F 9/5016 (2013.01)
(58) Field of Classification Search
CPC ...................................... G06F 9/5016
See application file for complete search history.

(56) References Cited

U.S. PATENT DOCUMENTS

| | | | | |
|---|---|---|---|---|
| 2004/0148463 A1* | 7/2004 | Brown | ................... | G09G 5/363 711/118 |
| 2008/0040561 A1* | 2/2008 | Bryant | ................... | G06F 9/5016 711/170 |
| 2008/0126623 A1* | 5/2008 | Chang | ................. | G06F 13/4059 710/52 |
| 2009/0044276 A1* | 2/2009 | Abdel-Aziz | ........ | H04L 63/1425 711/E12.091 |
| 2009/0106521 A1* | 4/2009 | Whisnant | ................ | H03M 7/30 711/170 |
| 2010/0042755 A1* | 2/2010 | Fuente | ..................... | G06F 13/28 711/170 |
| 2010/0223262 A1* | 9/2010 | Krylov | .................. | G06F 16/907 707/E17.014 |
| 2011/0264870 A1* | 10/2011 | Ylonen | ............... | G06F 12/0261 711/E12.001 |
| 2012/0151144 A1* | 6/2012 | Yohn | ................... | G06F 12/0871 711/E12.024 |
| 2014/0019706 A1* | 1/2014 | Kanfi | .................... | G06F 16/122 711/171 |
| 2014/0149364 A1* | 5/2014 | Braverman | ......... | G06F 16/2365 707/692 |

(Continued)

Primary Examiner — Tuan C Dao
(74) Attorney, Agent, or Firm — James J. DeCarlo; Greenberg Traurig, LLP

(57) ABSTRACT

The disclosed embodiments describe techniques for allocating memory to functions processing big data. In one embodiment, a method is disclosed comprising allocating a first memory space to a function, the memory space comprising an initial amount of memory for the function; declaring the first memory space as the current memory space; processing data using the function, the processing writing data to the current memory space; determining that the function requires additional memory space; allocating a new memory space based on the current memory space and a growth factor; copying all data in the current memory space to the new memory space; declaring the current memory space as the old memory space; declaring the new memory space as the current memory space; and not deallocating the old memory space.

20 Claims, 12 Drawing Sheets

(56) References Cited

U.S. PATENT DOCUMENTS

| | | | |
|---|---|---|---|
| 2016/0139815 A1* | 5/2016 | Levy | G06F 3/0644 |
| | | | 711/158 |
| 2019/0295114 A1* | 9/2019 | Pavletic | G06F 18/214 |
| 2020/0175374 A1* | 6/2020 | Hestness | G06N 3/084 |
| 2022/0383188 A1* | 12/2022 | Ananthanarayanan | |
| | | | G06F 18/214 |
| 2023/0060922 A1* | 3/2023 | Rhodes | G06F 9/5016 |

* cited by examiner

FIXED GROWTH, FIXED SLOPE DETAIL TABLE —— 402
Growth Factor  :   2.000  ◄—— 404
Slope          :  -1.000

| AggSize | NumAgg | PerfectAlloc | FixedAlloc | EconAlloc | EconAggSize |
|---|---|---|---|---|---|
| 16 | 524,288 | 8,388,608 | 549,755,813,888 | 8,388,608 | 16 |
| 32 | 262,144 | 8,388,608 | 274,877,906,944 | 12,582,912 | 48 |
| 64 | 131,072 | 8,388,608 | 137,438,953,472 | 14,680,064 | 112 |
| 128 | 65,536 | 8,388,608 | 68,719,476,736 | 15,728,640 | 240 |
| 256 | 32,768 | 8,388,608 | 34,359,738,368 | 16,252,928 | 496 |
| 512 | 16,384 | 8,388,608 | 17,179,869,184 | 16,515,072 | 1,008 |
| 1,024 | 8,192 | 8,388,608 | 8,589,934,592 | 16,646,144 | 2,032 |
| 2,048 | 4,096 | 8,388,608 | 4,294,967,296 | 16,711,680 | 4,080 |
| 4,096 | 2,048 | 8,388,608 | 2,147,483,648 | 16,744,448 | 8,176 |
| 8,192 | 1,024 | 8,388,608 | 1,073,741,824 | 16,760,832 | 16,368 |
| 16,384 | 512 | 8,388,608 | 536,870,912 | 16,769,024 | 32,752 |
| 32,768 | 256 | 8,388,608 | 268,435,456 | 16,773,120 | 65,520 |
| 65,536 | 128 | 8,388,608 | 134,217,728 | 16,775,168 | 131,056 |
| 131,072 | 64 | 8,388,608 | 67,108,864 | 16,776,192 | 262,128 |
| 262,144 | 32 | 8,388,608 | 33,554,432 | 16,776,704 | 524,272 |
| 524,288 | 16 | 8,388,608 | 16,777,216 | 16,776,960 | 1,048,560 |
| 1,048,576 | 8 | 8,388,608 | 8,388,608 | 16,777,088 | 2,097,136 |

Summary:                 1,048,568       142,606,336       1,099,503,239,168       268,435,584

Fixed / Perfect (F/P):   7,710.06  ◄—— 408
Fixed / Econ    (F/E):   4,095.97  ◄—— 410
Econ  / Perfect (E/P):       1.88  ◄—— 412

FIG. 4

SYSTEMS AND METHODS FOR MEMORY MANAGEMENT IN BIG DATA APPLICATIONS

BACKGROUND

The exponential growth of data in every facet of human endeavor has necessitated the rise of applications capable of efficiently and quickly processing massive amounts of data. Current systems generally do not efficiently allocate memory when processing such massive amounts of data.

BRIEF SUMMARY

The example embodiments provide systems, devices, computer-readable media, and methods for dramatically improving the amount of memory required by applications processing massive amounts of data.

The analysis of massive data often requires parsing the data into associated values called tuples, which are then conceptually organized into tables of rows and columns where each tuple becomes a row. Using a website analysis application as a simple example, the columns could be user identifier (ID), timestamp, website, and gender. The corresponding row would be a user's unique ID, along with the timestamp of when that user visited the named website and the user's gender. The website column has the property of a high-cardinality dimension, because the number of different websites around the world is very large. The gender column is an example of a low cardinality dimension as the number of possible values is very small.

In some environments, millions of these rows of data can be collected from websites all over the world and stored in a central location to be analyzed. Because any individual user can visit many different websites every day, and may often visit the same website multiple times a day, some or all of these columns can contain duplicates.

As an example, an analysis task for this scenario may be defined as a task to compute the number of unique visitors for every website. To complete the task, an application will use an "aggregator function" (or, simply, an "aggregator") to track the number of unique visitors to a specific website. During operation, the application must allocate memory space for an aggregator function for each website. If we assume we have one million websites, we will need one million aggregator functions and one million allocations of space for these aggregator functions.

As each row is processed, the application may find a corresponding website aggregator function and presents a user ID to the aggregator function. The aggregator function maintains a list of unique user IDs seen so far, checks the incoming user ID against this list, and if it has not been seen before, it adds the user ID to its list. If it has seen this user ID previously, the presented user ID may be ignored. At the end of processing of all rows, the number of user IDs in the aggregator's list is the unique count of visitors to that website. In practice, a few popular websites will have many user IDs in their lists, while many websites will have only a few.

One property of human-generated data is that for high-cardinality dimensions (e.g., the website column in the previous example) associated with a frequency attribute (e.g., the number of unique user IDs), the distribution of the number of unique user IDs versus the number of websites with that number of unique user IDs tends to follow a power-law distribution. When plotted on a chart with both axes logarithmic, the number of rows (websites) versus the frequency of user IDs associated with the number of rows is roughly a straight line. FIG. 1 depicts a typical example drawn from real data.

In FIG. 1, the left of the graph 100 illustrates that about ten million websites (rows) were associated with only one visitor cookie (user ID), while on the right of the graph 100, there was at least one website (i.e., row) that had over 400 million user cookies. In the middle of the graph 100, there were ten thousand websites that each had ten thousand unique users. One of the properties of a power-law distribution is the slope of the resulting line. In graph 100, the slope is negative because the curve slopes downward, going from left to right. As noted on the chart, the upper part of the curve has a slope of about −0.62, and the lower part of the curve has a slope of −0.96, which is close to −1.0. Thus, the overall trend is roughly a straight line over multiple orders of magnitude on both axes.

Aggregator functions typically used to process this kind of data are designed to have geometric growth properties. This means that the size of the aggregator function starts small, and when extra space is needed, the application or the aggregator function resizes its usable space by a constant factor (r) which can be any positive number greater than 1.0 but typically is 2.0 or more. After an aggregator function is initialized at a starting size, if the aggregator function needs to grow, the new allocated size for any one aggregator function can be defined as follows:

$$\text{size}_{new} = \text{size}_{current} * r \qquad \text{Equation 1}$$

where $\text{size}_{new}$ represents the new memory space size, $\text{size}_{current}$ represents the current memory space size, and r represents a fixed (i.e., constant) growth factor.

Some aggregator functions can have an upper bound on their size. If a specific aggregator function does not specify an upper size bound, the user will typically compute a practical upper size bound based on the overall size of the user's data. Either way, this knowledge of the upper size bound is commonly used to allocate the overall consumption of computer memory, which would be the number of aggregator functions required times the upper size bound of the aggregator function. If, during processing, an aggregator function exceeds its upper size bound, it may require special handling. This special handling varies considerably across applications and is not limiting.

If we let $a = \text{size}_{start}$, then the sequence of new sizes that the aggregator function goes through as it grows is:

$$a, ar^2, ar^3, \ldots, ar^{k-1} \qquad \text{Equation 2}$$

where k is the number of size terms in the sequence, r is the growth factor, and a is the initial or starting size of the aggregator function. The progression in Equation 2 comprises a geometric progression. One property of this progression is its dynamic range, which is the largest size of an aggregator divided by its starting size, or $$\frac{ar^{k-1}}{a} = r^{k-1} \qquad \text{Equation 3}$$

The dynamic range is typically greater than two but can be many orders of magnitude. In some embodiments, the larger the dynamic range, the more pronounced the savings in memory usage. However, even for cases where the dynamic range is as low as two, the example embodiments still provide significant technical benefits.

Big data applications may need to allocate millions of these aggregator functions while processing raw data. Since each aggregator function requires variable memory space, memory management is paramount to the performance of these big data applications.

Thus, there currently exist problems in the state of the art regarding how an application should allocate space for these aggregator functions before processing begins without the knowledge of which functions will need lots of space and which ones will need only a small amount of space. These example embodiments demonstrate dramatic savings in the amount of memory required by a computing device or system and thus improve the overall function of a computing device or system.

In the various embodiments, methods, systems, computer-readable media, and devices are described for allocating memory to functions processing big data.

In one embodiment, a method is disclosed comprising allocating a first memory space to a function, the memory space comprising an initial amount of memory for the function; processing data using the function, the function writing data to the first memory space; determining that the function requires additional memory space; allocating a new memory space based on a predefined growth factor and the current size of the allocated memory space. This is followed by the aggregator function copying its data from the previous memory space to the new memory space and continuing its aggregation function. This embodiment allows the previous memory space to not be deallocated or collected by any garbage collection function. In some embodiments, for performance reasons, the method may not attempt to deallocate and collect the previous memory space until the overall analysis application has completed its job.

In one embodiment, the method further comprises determining that the size of the new memory space exceeds a preconfigured maximum and may raise an exception or flag, which indicates to the application that special handling is required.

The disclosed embodiments further provide non-transitory computer-readable storage media and devices for performing the above methods. In one embodiment, the non-transitory computer-readable storage media tangibly stores computer program instructions capable of being executed by a computer processor, the computer program instructions defining steps of the methods.

BRIEF DESCRIPTION OF THE DRAWINGS

FIG. 4 is a table illustrating typical memory allocations using the disclosed embodiments.

DETAILED DESCRIPTION

Figure 1:
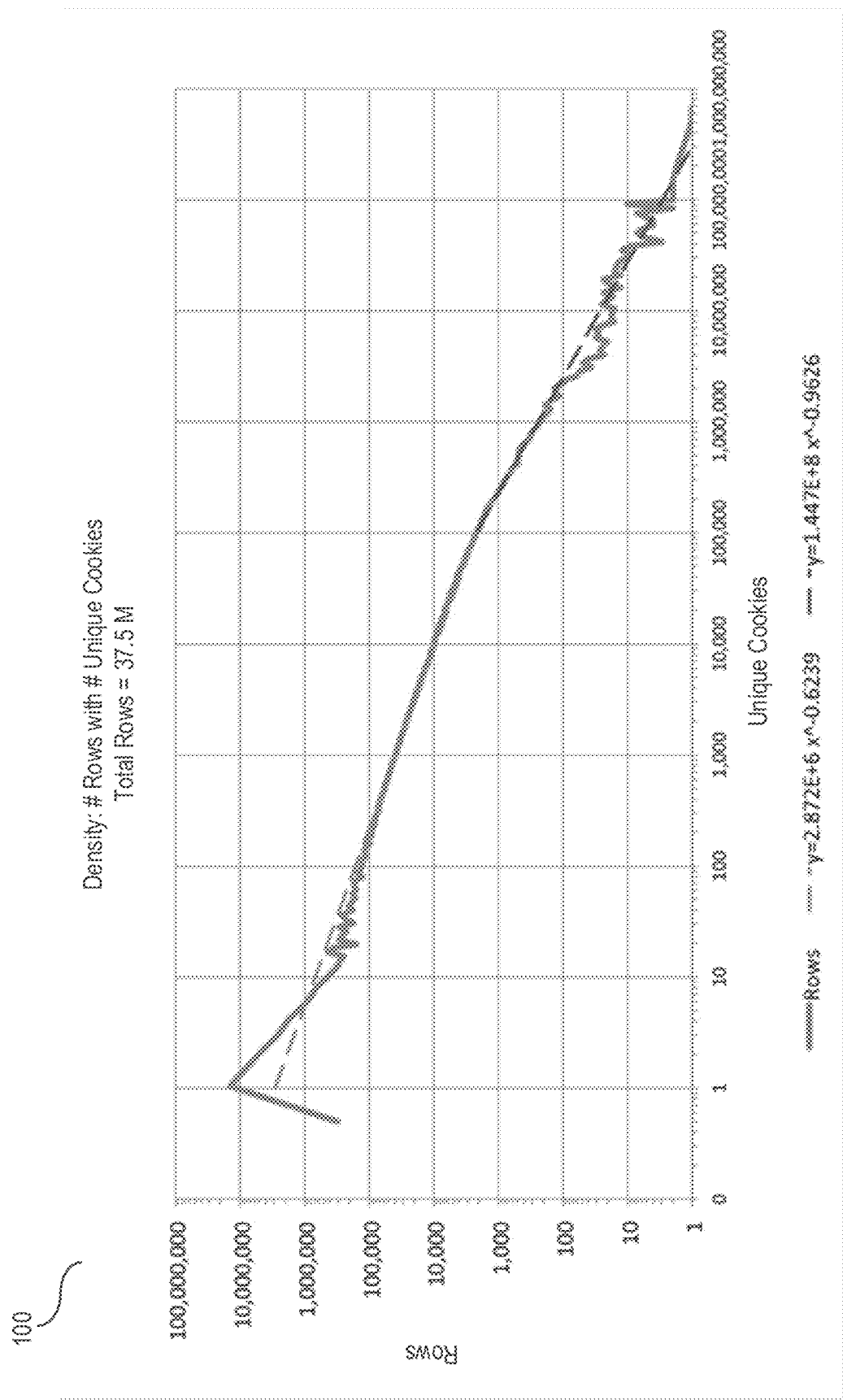
FIG. 1 is a graph illustrating a typical real data set exhibiting a power-law distribution.

FIG. 1 is a graph (100) illustrating a typical real data set exhibiting a power-law distribution.

In the graph (100), a row count is plotted as a function of the number of unique cookies. In an embodiment, each row can be associated with a website, website page, or URL. In graph 100, the number of unique cookies (i.e., unique visitor IDs) is counted for each row (i.e., website). Then the number of rows having a number of unique cookies is plotted as illustrated in FIG. 1. This is a typical example of the power-law distribution of real data.

The data set in FIG. 1 includes about 37.5 million rows. As illustrated, a corresponding number of unique cookies is plotted on a logarithmic scale from one to one billion. Thus, as one example, the number of rows (e.g., websites) having one unique cookie is equal to approximately ten million. Similarly, the number of rows having 100 million unique cookies is equal to approximately ten. As illustrated by the trendline, the mapping of unique cookies to rows follows a power-law distribution.

In an embodiment, a big data application may process data represented in FIG. 1 by assigning an aggregator function for each website, website page, or URL. Details of FIG. 1 were described previously and are not repeated herein.

Figure 2:
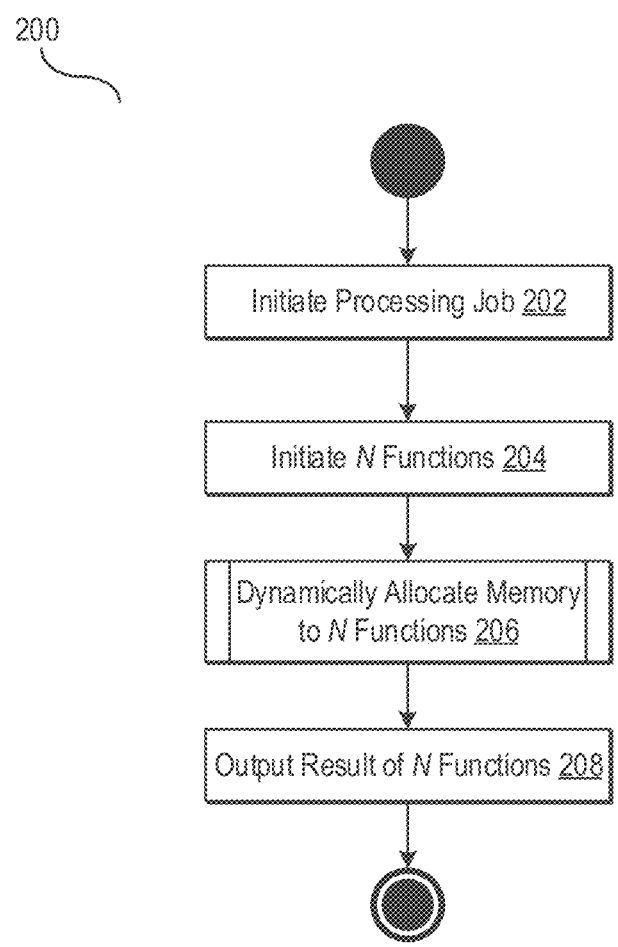
FIG. 2 is a flow diagram illustrating a method for processing large data sets using a dynamic memory allocation method according to some embodiments of the disclosure.

FIG. 2 is a flow diagram illustrating a method 200 for processing large data sets using a dynamic memory allocation method according to some embodiments of the disclosure.

In step 202, the method 200 can include initiating a processing job.

In one embodiment, a processing job can comprise any executable code configured to process data. In one embodiment, the data can comprise a large amount of data. In one embodiment, the method 200 can define the processing job as a series of discrete functions. These functions can be different in some embodiments, while in other embodiments, the functions can comprise the same function, replicated multiple times. In some embodiments, the method 200 may execute these functions in a distributed manner. For example, in some embodiments, the method 200 may spawn multiple identical functions to parallel process partitions of a dataset.

As one example, a dataset can comprise a table or other structured data. In other embodiments, the dataset can comprise an unstructured dataset. In one embodiment, the method 200 includes a pre-processing step whereby the method 200 partitions the dataset into a set of smaller datasets based on specified criteria. For example, a dataset can comprise a set of unique cookies recorded across multiple websites, as described in FIG. 1. In this example, the method 200 can include grouping the unique cookies based on a website identifier (e.g., domain) and thus forming a set of "rows" of the dataset, each row corresponding to a website.

In some embodiments, initiating the processing job can comprise reading data from the dataset (including partitions if pre-processed) and feeding the data into one or more functions. For example, method 200 begins reading data in one embodiment and provides data to the functions as the method 200 iterates through the data set. In one embodiment, method 200 can dynamically initialize functions as needed. However, the method 200 can initialize a fixed number of functions (e.g., based on available hardware or processing resources).

In step 204, method 200 can include initiating N functions, where N is the estimated number of rows (or websites) that need to be processed by the application.

As discussed above, the method 200 can include partitioning a larger dataset into smaller chunks or partitions. However, in some embodiments, the method 200 does not equally partition the data. That is, specifically, the size of the data in each partition can vary across partitions. For example, a large number of partitions may include very little data, while a smaller number may include a large amount of data. Continuing the previous example, a small number of websites can include many unique cookies (e.g., the most frequently visited websites). In contrast, a much larger number of less frequently visited websites can include a smaller number of unique cookies. As discussed previously, the data processed by the method 200 exhibits a power-law distribution of data in many scenarios.

In one embodiment, the method 200 initiates the N functions as needed. That is, for each contained row of data, method 200 initiates a new function. Thus, in such embodiments, the number of functions (N) is equal to the number of rows (or websites that need to be processed with the raw data. In general, method 200 can implement this approach when implemented in an elastic compute environment. For example, the method 200 can implement each of the N functions as a serverless function. In such an embodiment, method 200 requires no information regarding the underlying data to be processed, and this enables method 200 to replicate the same function for all partitions. However, as will be discussed, this feature also results in the lack of knowledge of the memory needed for the function to operate. In another embodiment, method 200 can allocate a fixed number (N) of functions and input data from the dataset into this fixed number of functions.

In step 206, the method 200 can include dynamically allocating memory to the N functions. Details of how the method 200 dynamically allocates memory to a given function in the N functions are provided, in more detail, in the description of FIG. 3. In brief, the method 200 allocates an initial, minimum amount of memory. A given function receives and processes data, using the initial memory allocation to store data and results. As the function ingests and processes data, it may determine that the initial allocation is insufficient to process the incoming or existing data. In response, method 200 can allocate or request a new region of memory based on a fixed growth factor and its current size and then move or copy its data from the current memory to the new memory. Method 200 can further retain a reference to the current memory allocation and not allow deallocation of the current memory. It is wide industry practice to consider this a memory leak and, thus, a programming error. However, the example embodiments will demonstrate that this behavior is close to optimum in terms of managing overall memory allocation for the application. Method 200 can continue to grow the memory space of the function in this manner until the application ends or until method 200 allocates a maximum amount of memory to the function.

In step 208, the method 200 can include outputting the results of the N functions.

After a given function of the N functions finishes processing its input data, it returns an output result. The disclosure does not limit the type of data output by a given function, and the function can output any type of content. In some embodiments, method 200 can receive the outputs of each function and further aggregate the outputs to a single output value. In some embodiments, the N functions can operate asynchronously, and thus method 200 can operate to await the results of all N functions before combining their outputs. In one embodiment, one can further modify the method 200 to manage the deallocation of memory used by the functions after application completion. However, in other embodiments, a given function may independently deallocate its memory when signaled to do so.

Figure 3:
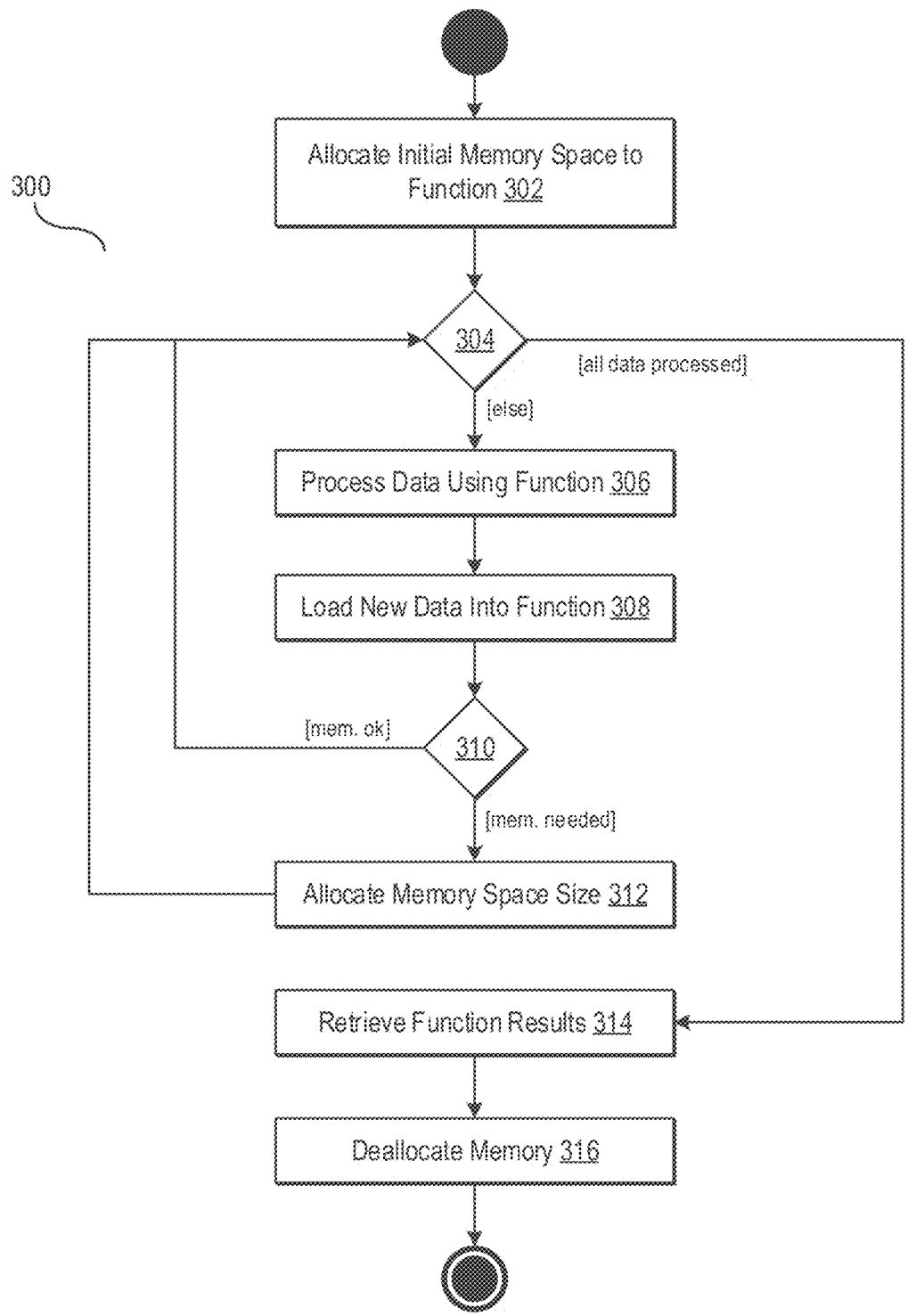
FIG. 3 is a flow diagram illustrating a method for dynamically allocating memory to a function according to some embodiments of the disclosure.

FIG. 3 is a flow diagram illustrating a method 300 for dynamically allocating memory to a function according to some embodiments of the disclosure.

In step 302, the method 300 can include allocating initial memory space to a function. In one embodiment, the initial memory space can comprise a minimum amount of memory. In one embodiment, this minimum amount of memory comprises a customizable amount of memory allocated for every function the method 300 allocates. As an example, the method 300 may allocate 16 bytes of random-access memory (RAM) for each function.

In step 304, method 300 determines if all data has been processed. If so, it branches to step 314. Otherwise, it branches to step 306.

In step 306, the method 300 can comprise processing data using the function. As discussed above, the method 300 can execute the function to perform operations on data received by the function. The disclosed embodiments place no limit on the type of operations performed.

In step 308, the application loads new data into the aggregator function. In general, the operations process data and write data to the allocated memory space (such as the initial memory space) during processing. At a minimum, the function will store input data in the memory space and may store the results of processing the memory space as well. Further, the function may store the output data of the function as well. As such, during the execution of the function, the function will continue to consume memory space. The function can (and often will) require additional memory space to process incoming data. However, the use of an initial memory allocation ensures that those functions requiring less than the minimum amount of memory do not require additional memory allocations.

In step 310, method 300 can determine if additional memory is needed. As will be discussed, if method 300 determines that the amount of memory currently allocated to the function is suitable, method 300 can proceed back to step 304 to process new data and load more data (steps 306 and 308, respectively) until step 310 is triggered. If, however, method 300 determines that more memory is needed, method 300 proceeds to step 312.

In step 312, method 300 computes the new memory space using Equation 1. It then moves all aggregator function data from the current memory space to the new memory space. It then labels the current memory space as old memory space; and labels the new memory space as current memory space. In step 312, the method 300 does not deallocate the old memory space. In some embodiments, step 312 can further include determining if the current memory space size has exceeded a preconfigured maximum memory space size where an exception or flag is raised to trigger special handling.

In one embodiment, the method 300 can externally manage the memory allocation for a function (or many functions). In such an embodiment, the memory space of the function is virtualized, and the executing function need not perform any manual or automatic memory allocation. In such an embodiment, an external process can monitor a designated memory space and manage the memory space (as will be discussed) upon determining that the currently allocated memory space is running out of available space. In such an embodiment, the function may allocate memory via implicit commands such as object creation, function creation, etc., and need not rely on lower-level memory allocation system calls (e.g., malloc or calloc). In such embodiments, method 300 can be executed in a garbage-collected environment such as a Java®, Ruby, or JavaScript environment. Although main Random Access Memory (RAM) is primarily used as an example, the disclosure is not limited solely to RAM allocation. Indeed, the techniques can equally be applied to, for example, persistent storage (e.g., Flash storage) devices.

In another embodiment, the functions themselves manage their own memory allocations. In this embodiment, the functions themselves manually (or semi-automatically) allocate memory space as needed. In general, such an approach requires that the functions be implemented in a lower-level programming language such as C, C++, Rust, or similar languages that provide memory allocation primitives. In other embodiments, the method 300 can provide a shared object or dynamically linked library that supports the memory allocation strategies described herein.

In one embodiment, the method 300 can use a constant growth factor to compute the new memory space to allocate. In one embodiment, the method 300 can calculate the size of the new memory space using Equation 1.

As one example, the method 300 may allocate an initial memory allocation of 16 and use a growth factor of 2.0. The first time the method 300 executes step 312, the method 300 computes a new memory space size of 16*2.0 or 32 bytes. Because the current memory is not deallocated, the total consumed space is 16+32=48 bytes. The second time the method 300 executes step 312, the method 300 computes a new memory space size of 32*r or 64 bytes, including the current allocation yields 32+64=96 bytes. Thus, as illustrated in FIG. 4, Column 406F, the incremental increase in memory space increases as a sum of a geometric progression each time the method 300 detects more memory is needed:

$$ar^0 + ar^1 + ar^2 + \ldots + ar^{k-1} = \sum_{i=0}^{k-1} ar^i = a\left(\frac{r^k - 1}{r - 1}\right),\qquad \text{Equation 4}$$

where k is the number of terms in the series, and a is the initial allocation size. Since both a and r are known, k can be estimated using modeling. Column 406F represents this sum equation where k varies from 1 to 17 in the example. Additionally, the total space consumed by a single function after k−1 growth cycles excluding the non-deallocated old memory spaces is just:

$$ar^{k-1}\qquad \text{Equation 5}$$

Further detail regarding Equations 4 and 5 are provided in the Appendix.

In step 314, the method 300 can include outputting the results of all the aggregation functions. The disclosure does not limit the type of data output by the functions, and the functions can output any type of content.

In step 316, the method 300 can include deallocating or freeing all memory spaces allocated to the functions at the end of all processing. In one embodiment, the method 300 can manually deallocate all memory prior to ending the execution of a function. In another embodiment, method 300 can comprise running a garbage collection routine to automatically reclaim all memory allocated during the execution of method 300.

FIG. 4 is a table 400 illustrating memory allocations using the disclosed embodiments where the power-law distribution of the incoming data has an approximate slope of −1.0, and the aggregation functions are configured with a fixed resize factor of 2.0. In the illustrated table 400, a model is depicted where the aggregation function has been configured with a growth factor (r) of 2.0 and an initial size of 16 bytes. The input data comprised approximately nine million rows being aggregated by about one million aggregators. The power-law effect of the incoming data is demonstrated in this table, where eight aggregators required a space of about one million bytes. Each of those aggregators would have been loaded by about 65 thousand rows. Meanwhile, about 525 thousand aggregators required a space of only 16 bytes, and each of those aggregators would have been loaded by just one row.

In table 400, a simulation of a processing job, such as that described in connection with FIGS. 2 and 3, is illustrated. In the illustrated table 400, a fixed growth factor 402 of 2.0 is used. As described previously, such a fixed growth factor is shown as an example, and other growth factors can be used. Further, in the illustrated embodiment, a hypothetical slope 404 of −1.0 is used. In the illustrated embodiment, the slope 404 is used to model the distribution of the input data analyzed by functions in aggregate. In the illustrated embodiment, the slope 404 comprises a log-log slope of a power-law distribution of the number of aggregator functions associated with a particular function's memory size.

In the illustrated embodiment, the first column 406A models the size of a function. Thus, as illustrated, the simulation represented by table 400 models functions taking 16, 32, 64, etc., bytes of data. The second column 406B models the expected number of functions for each size as a result of a power-law distribution with a growth factor 402 of 2.000 and an overall log-log slope 404 of −1.000. In the illustrated embodiment, the model was configured so that the minimum or initial size of a function is 16 bytes, the maximum size of a function is about one million bytes, and the total number of functions in the system is about one million.

In the illustrated embodiment, the third column 406C is the product of the first column 406A and second column 406B and represents an ideal or "perfect" memory allocation if such an allocation was practical. As illustrated in the total row, a perfect allocation for all aggregator functions would total about 143 MB.

In the illustrated embodiment, the fourth column 406D represents a fixed memory allocation where the system application hypothetically allocates the maximum function size (1 MB) for all one million functions. As illustrated in the total row, this results in an overall allocation of about one terabyte. Notably, the fourth column 406D represents memory allocation in the majority of current systems where the data size cannot be known in advance. As discussed previously, big data applications generally do not know which of the many functions will need to grow larger or by how much. As a result, system developers will typically allocate, upfront, the maximum memory size (e.g., 1 MB in FIG. 4) for all sub-component functions. As illustrated in the total row, this results in large amounts of wasted memory (e.g., one terabyte of Fixed space versus 143 MB of Perfect space allocation). This is also labeled the F/P ratio. In this example, the fixed allocation is about 7,710 times larger than the perfect allocation would be.

In the illustrated embodiment, the sixth column 406F represents the storage consumed by a single given function using the method of FIGS. 2 and 3 if that function were to grow through 16 stages of growth. In the illustrated embodiment, for example, a function requiring 16 bytes of memory is allocated 16 bytes of memory, a function requiring 32 bytes of memory is allocated 48 bytes of memory, etc. In the illustrated embodiment, the fifth column 406E represents the product of the sixth column 406F and the predicted number of functions in the second column 406B. As illustrated in the total row, this results in an overall allocation of about 268 MB. The ratio of the total of column 406E divided by the total of the Perfect allocation column, or 142 MB, also labeled as the E/P ratio, is about 1.88, or less than 2.0 Also, note that the ratio of the total of the fixed allocation column divided by the total of the 5th column is about 4095. This means that the method described in FIGS. 2 and 3 results in a memory savings that is 4095 times smaller than if the fixed allocation scheme was used. This is also labeled the F/E ratio.

In the illustrated embodiment, the total of the third column 406C represents a floor of memory allocations in a perfect allocation scheme, while the total of the fourth column 406D represents a ceiling (e.g., fixed) allocation that will meet the demands of the system. As illustrated, the memory allocated using the methods of FIGS. 2 and 3, or about 268 MB, is significantly less than the total of the fourth column 406D, about 1 terabyte, and significantly closer to that of a perfect memory allocation, of 143 MB, as illustrated in the total of the third column 406C.

In the illustrated embodiment, the fourth column 406D and fifth column 406E all represent the "final" memory allocations for each function after the processing job executes and thus represent a maximum memory allocation during the lifetime of the processing job.

In the illustrated embodiment, various comparisons are provided. In a first comparison 408, the fixed memory allocation and perfect allocation are compared. As illustrated, the fixed memory allocation uses 7,710 times more memory than the perfect case. Similarly, in the second comparison 410, the fixed memory allocation uses 4,096 times more memory than the allocations performed using the methods of FIGS. 2 and 3. Finally, a third comparison 412 illustrates the performance of the methods of FIGS. 2 and 3 with respect to the perfect allocation scheme. As illustrated, the allocations performed using the methods of FIGS. 2 and 3 are only 1.88 times greater than the perfect allocation scheme. Thus, as illustrated, when the distribution of data sizes approximates a power-law distribution, the allocations performed using the methods of FIGS. 2 and 3 can perform significantly better than standard approaches currently used, namely the fixed memory allocation. As illustrated in table 400, using a fixed memory allocation approach would be impossible with a single device (e.g., laptop or local developer machine) and would require coordination across multiple devices, further complicating such a system. By contrast, using the methods of FIGS. 2 and 3, the same processing job can be performed easily on a commodity device or local workstation.

Figure 5A:
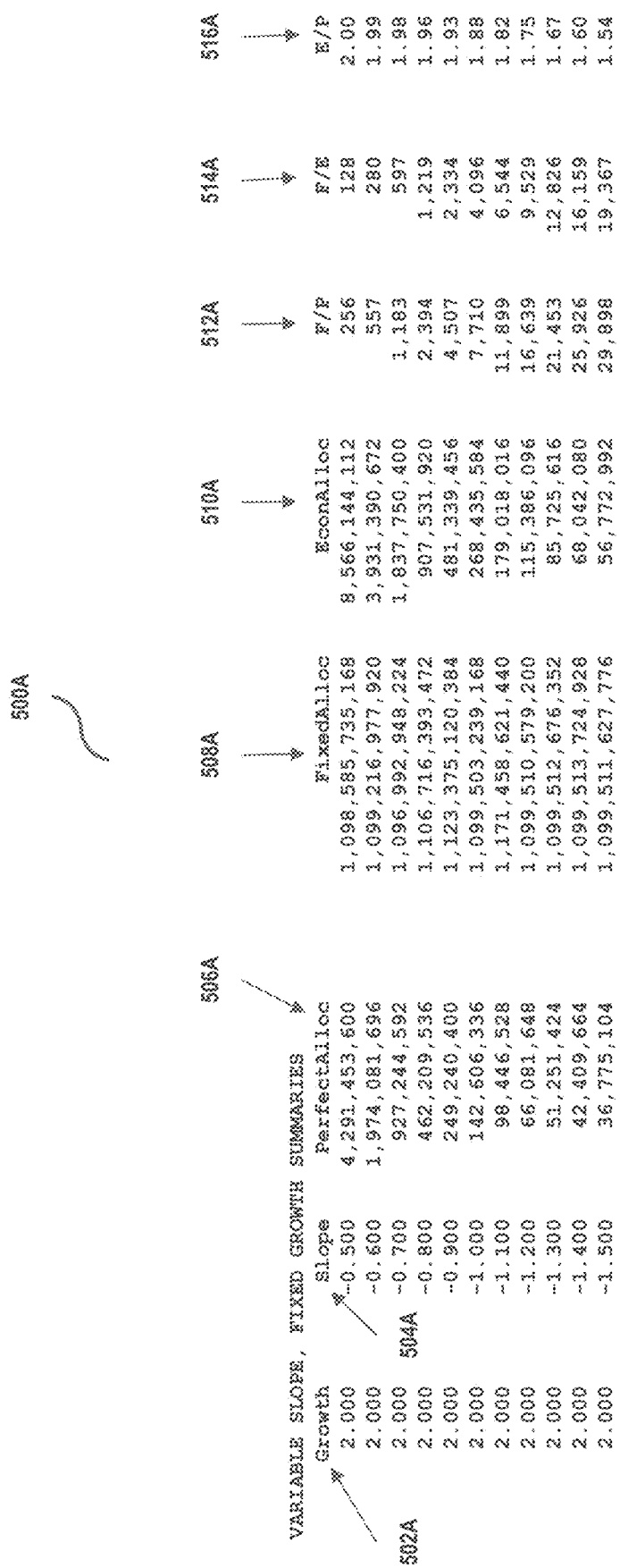
FIG. 5A is a table illustrating memory allocations using the disclosed embodiments.

FIG. 5A is a table 500A illustrating memory allocations using the disclosed embodiments, where the growth factor is held constant at 2.0, and the assumed slope of the power-law distribution of the input data varies from a shallow log-log slope of −0.5 to a very steep log-log slope of −1.5. Each row of the table 500A is the last three columns of the Summary row from FIG. 4 along with the three columns of metrics showing the effectiveness of the memory savings (discussed herein).

In the illustrated table 500A, a plurality of simulations was performed using a fixed growth rate 502A and a variable log-log slope 504A. For each simulation, the table 500A illustrates a total memory allocation using a perfect allocation 506A, fixed memory allocation 508A, and improved allocation 510A performed using the methods of FIGS. 2 and 3. Details of each approach were provided in the description of FIG. 4 and are not repeated herein. In brief, each row of the table 500A can correspond to the total row of FIG. 4, albeit with differing slopes. Thus, the individual distribution of function allocations is not illustrated in FIG. 5A. In the illustrated embodiment, and as discussed previously, the variable slope 504A corresponds to the distribution properties of the underlying data set. Since this slope 504A is dependent on the input data, the table 500A illustrates the performance of the methods of FIGS. 2 and 3 with different distributions of data.

As illustrated, various comparisons are depicted, including a first comparison 512A of F/P, which is between the fixed memory allocation 508A approach and the perfect allocation 506A, a second comparison 514A of F/E, which is between the fixed memory allocation 508A approach and the improved allocation 510A, and a third comparison 516A of E/P, which is between the improved allocation 510A and the perfect allocation 506A. In general, the first comparison 512A is obtained by dividing the fixed memory allocation 508A approach by the perfect allocation 506A, the second comparison 514A is obtained by dividing the fixed memory allocation 508A by the improved allocation 510A, and the third comparison 516A is obtained by dividing the improved allocation 510A by the perfect allocation 506A.

As illustrated, the improved allocation 510A outperforms the fixed memory allocation 508A in all simulations. Further, the improved allocation 510A never utilizes more than double the memory used by the perfect allocation 506A as illustrated in column 516A. By contrast, at steep slopes of −1.5, the fixed memory allocation 508A is significantly larger than the perfect memory allocation 506A. Thus, the steeper the slope, the larger is the benefit of using the methods of FIGS. 2 and 3.

In the illustrated embodiment, the third comparison 516A can be considered the efficiency of the improved allocation 510A performed using the methods of FIGS. 2 and 3. In the embodiments, the efficiency of the improved allocation 510A can be guaranteed to be less than or equal to two, that is, double the perfect allocation 506A. In one embodiment, this guarantee will hold for all growth factors greater than or equal to two (2.0) and all slopes greater than zero. In the illustrated embodiment, small growth factors require more overall allocation than larger growth factors. However, a growth factor of 2.0 is very common. In some embodiments, shallow slopes require more overall allocation than steep slopes. However, the slope is determined by the input data and is thus not subject to change by the allocation routine.

Figure 5B:
FIGS. 5B through 5D are graphs illustrating memory allocations using the disclosed embodiments, and graphically displaying the data of FIG. 5A.
Figure 5C:
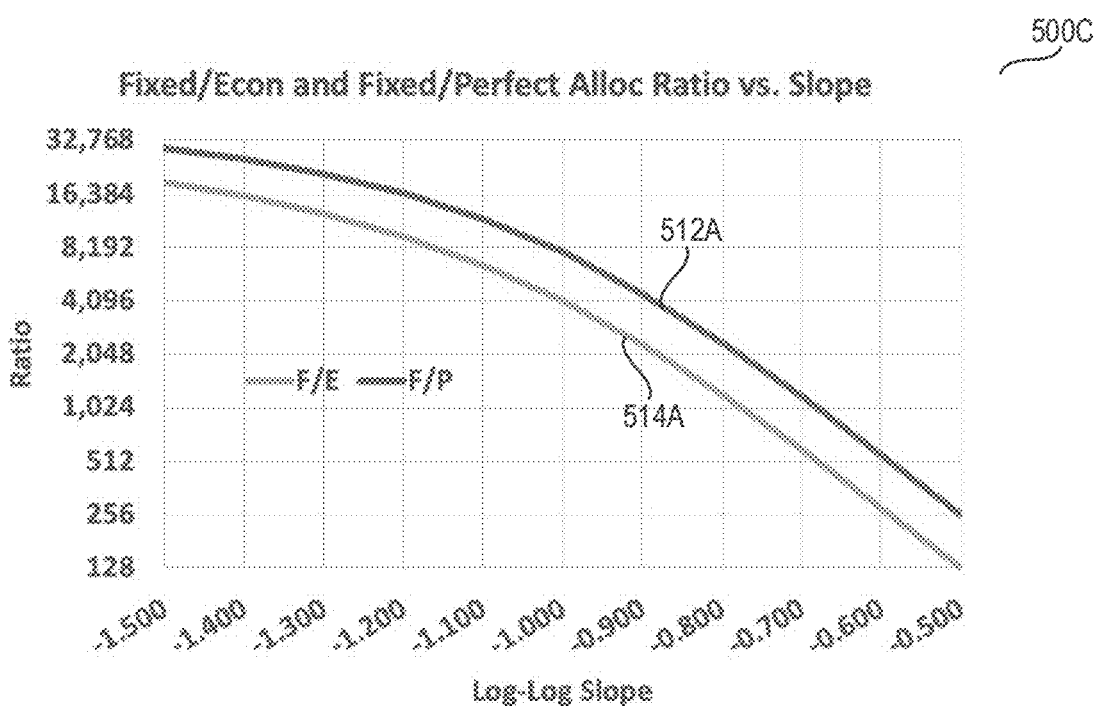
Figure 5D:

FIGS. 5B through 5D are graphs illustrating memory allocations using the disclosed embodiments.

In graph 500B, column 516A (E/P) is plotted as a function of log-log slope column 504A on a linear scale.

In graph 500C, column 514A (F/E) and column 512A (F/P) are plotted as a function of slope 504A on a linear scale.

In graph 500D, the perfect allocation 506A and improved allocation 510A, in bytes, are plotted as a function of slope 504A.

As illustrated in graph 500B and graph 500C, the improved allocation 510A consistently outperforms the fixed memory allocation 508A. Further, the improved allocation 510A grows in effective lockstep with the perfect allocation 506A.

Figure 6A:
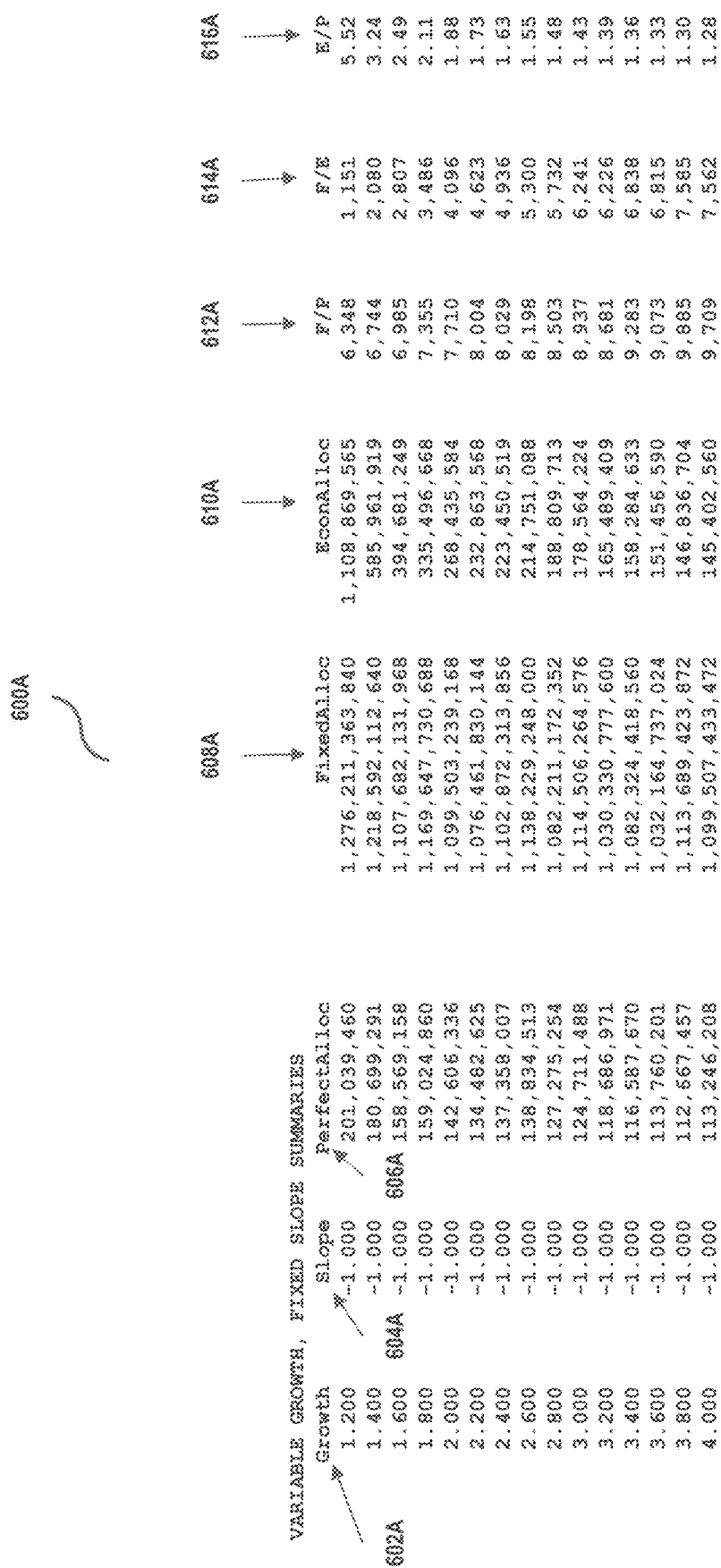
FIG. 6A is a table illustrating memory allocations using the disclosed embodiments.

FIG. 6A is a table illustrating memory allocations using the disclosed embodiments, where the log-log slope is held constant at −1.0, and the configured growth factor of the aggregator functions varies from a slow growth factor of 1.2 to a much faster growth factor of 4.0. This is a variation of the model used in FIG. 5A, except here, the slope is kept constant at −1.0, and the growth factor is allowed to vary from 1.2 to 4.0.

In the illustrated table 600A, a plurality of simulations was performed using a variable growth factor 602A and a fixed log-log slope 604A. For each simulation, the table 600A illustrates a total memory allocation using a perfect allocation 606A, fixed memory allocation 608A, and improved allocation 610A performed using the methods of FIGS. 2 and 3. Details of each approach were provided in the description of FIG. 4 and are not repeated herein. In brief, each row of the table 600A can correspond to the total row of FIG. 4, albeit with differing growth factors. Thus, individual function allocations are not illustrated in FIG. 6A. In the illustrated embodiment, and as discussed previously, the variable growth factor 602A corresponds to the amount of memory allocated to functions when such functions exhaust their current memory. The fixed memory allocation 608A allocates the maximum memory to all functions upfront, so the growth factor is not influencing the figures in 608A.

Since this growth factor 602A is being adjusted by the simulation model, the table 600A illustrates the performance of the methods of FIGS. 2 and 3 with different growth factor configuration settings that might be chosen in an actual application.

As illustrated, various comparisons are depicted, including a first comparison 612A (F/P) between the fixed memory allocation 608A approach and the perfect allocation 606A, a second comparison 614A (F/E) between the fixed memory allocation 608A approach and the improved allocation 610A, and a third comparison 616A (E/P) between the improved allocation 610A and the perfect allocation 606A. In general, column 612A (F/P) is obtained by dividing the fixed memory allocation 608A approach by the perfect allocation 606A, column 614A (F/E) is obtained by dividing the fixed memory allocation 608A by the improved allocation 610A, and column 616A (E/P) is obtained by dividing the improved allocation 610A by the perfect allocation 606A.

As illustrated, the improved allocation 610A outperforms the fixed memory allocation 608A in all simulations. Further, the improved allocation 610A never utilizes more than double the memory used by the perfect allocation 606A as long as the configured growth factor is above two (2.0). However, note that as the configured growth factor decreases, the overall memory allocation increases even for the Perfect allocation, so there is little incentive for using such low growth factors. For configured growth factors greater than 2.0 the improved allocation 610A outperforms the fixed memory allocation 608A by orders of magnitude.

Figure 6B:
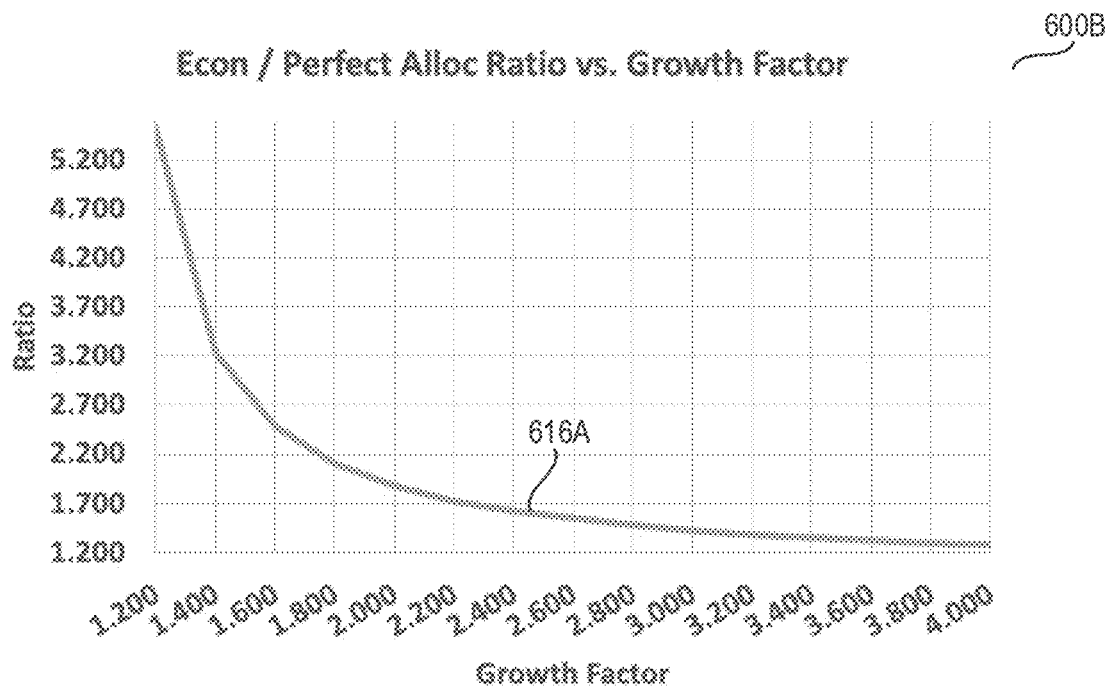
FIGS. 6B through 6D are graphs illustrating memory allocations using the disclosed embodiments and graphically displaying the data of FIG. 6A.
Figure 6C:
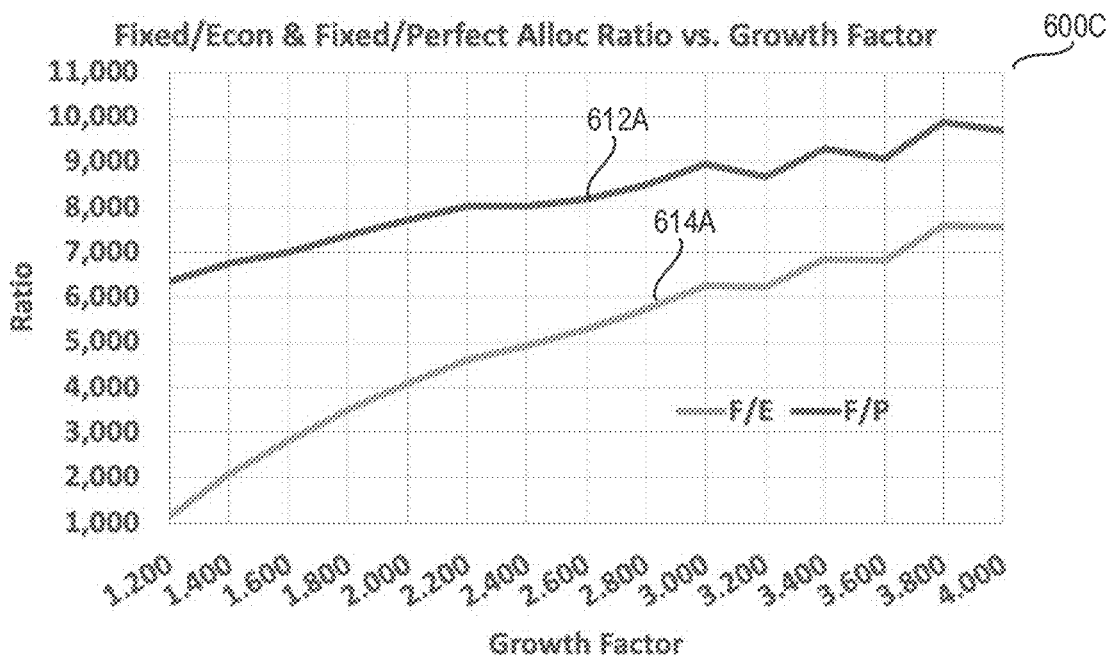
Figure 6D:
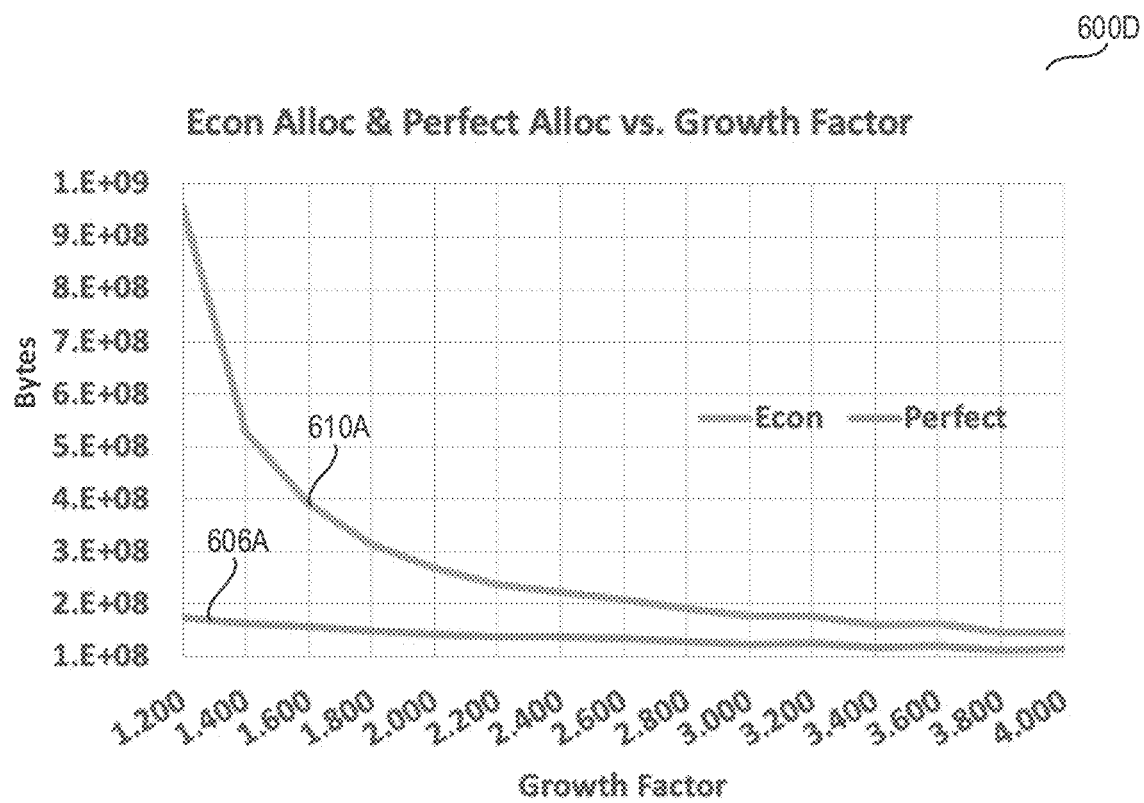

FIGS. 6B through 6D are graphs illustrating memory allocations using the disclosed embodiments.

In graph 600B, the third comparison 616A (E/P) is plotted as a function of growth factor 602A on a linear scale.

In graph 600C, column 614A and column 612A are plotted as a function of growth factor 602A on a linear scale.

In graph 600D, the perfect allocation 606A and improved allocation 610A, in bytes, are plotted as a function of growth factor 602A. As illustrated in graph 600B and graph 600C, the improved allocation 610A consistently outperforms the fixed memory allocation 608A. Further, for growth factors greater than 2.0, the improved allocation 610A is always less than or equal to two times the perfect allocation 606A.

Figure 7:
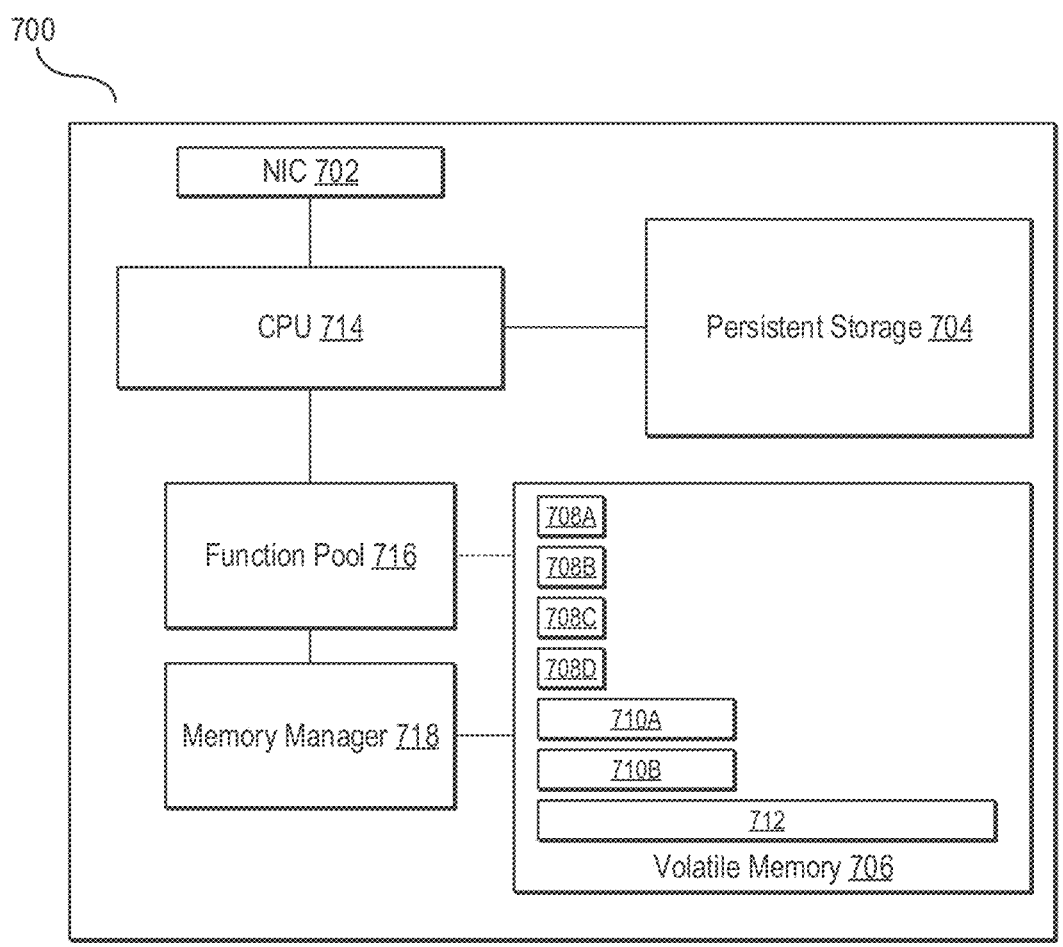
FIG. 7 is a block diagram illustrating a computing device showing an example of a computing device 700 used in the various embodiments of the disclosure.

FIG. 7 is a block diagram illustrating a computing device showing an example of a computing device 700 used in the various embodiments of the disclosure.

In some embodiments, computing device 700 can comprise a network interface card (NIC) 702, central processing unit (CPU) 714, persistent storage 704, volatile memory 706, function pool 716, and memory manager 718.

In some embodiments, the CPU 714 may comprise a general-purpose CPU. The CPU 714 may comprise a single-core or multiple-core CPU. The CPU 714 may comprise a system-on-a-chip (SoC) or a similar embedded system. In some embodiments, a GPU may be used in place of, or in combination with, a CPU 714. In the illustrated embodiment, the CPU 714 can receive and transmit data to other devices via NIC 702. In one embodiment, NIC 702 can comprise an Ethernet interface or other network interface. In some embodiments, the CPU 714 can be used to process big data workloads as part of a processing job. In such an embodiment, the CPU 714 can receive this data via the NIC 702.

In one embodiment, the CPU 714 can store data persistently in persistent storage 704. As one example, CPU 714 can receive big data from an external data source and cache the big data in the persistent storage 704. In some embodiments, this storage can be temporary while the computing device 700 executes a processing job. In another embodiment, CPU 714 can receive data as a stream directly to the function pool 716 for processing.

In an embodiment, CPU 714 can manage a function pool 716 of functions associated with a processing job. Details of functions implementing a processing job have been described previously and are not repeated herein. In an embodiment, the function pool 716 can be implemented in the CPU 714 in hardware or can comprise software instructions executing in volatile memory 706. In some embodiments, each function in the function pool 716 can comprise an identical function spawned for a partition of data, as previously discussed. As one example, a big data dataset can be stored in persistent storage 704. The CPU 714 can then partition the big data dataset and spawn a plurality of functions in the function pool 716 for each partition. In an embodiment, CPU 714 is configured to execute steps 202, 204, and 208 of FIG. 2.

In an embodiment, the computing device 700 comprises a memory manager 718. As with function pool 716, in an embodiment the memory manager 718 can be implemented in the CPU 714 in hardware or can comprise software instructions executing in volatile memory 706. In an embodiment, the memory manager 718 manages the memory used by functions in the function pool function pool 716. As discussed, the memory manager 718 can be part of a managed execution environment (e.g., a Java environment or similar environment). In an embodiment, memory manager 718 communicates with the function pool 716 and intercepts all memory allocations requested and processed for the functions. As such, in an embodiment, memory manager 718 may handle all memory allocation commands (either implicit or explicit) issued by functions in the function pool 716. Specifically, memory manager 718 can be configured to execute the methods described in FIG. 3.

As illustrated, memory manager 718 is communicatively coupled to volatile memory 706. In an embodiment, memory manager 718 allocates memory (e.g., 708A, 708B, 708C, 708D, 710A, 710B, 712) to functions in the function pool 716. As illustrated graphically on the x-axis, the size of memory 708A, 708B, 708C, 708D, 710A, 710B, 712 for each function varies based on the input data and memory requirements as described in more detail in the description of FIG. 3. The specific number and sizing of memory 708A, 708B, 708C, 708D, 710A, 710B, 712 is not intended to accurately depict the exact contents of memory and is provided solely to illustrate the differing sizes of memory managed by memory manager 718.

In an embodiment, memory manager 718 is configured to manage memory allocations as well as writing to memory. In such an embodiment, functions in the function pool 716 issue requests to write to volatile memory 706 via memory manager 718. In another embodiment, as illustrated by the dotted line, after allocation, functions in the function pool 716 can write to volatile memory 706 directly. However, in such an embodiment, memory manager 718 manages the sizing of memory 708A, 708B, 708C, 708D, 710A, 710B, 712 for each function.

In an embodiment, memory manager 718 further includes a garbage collector configured to monitor the status of functions in the function pool 716 and periodically free memory used by the functions when the functions are terminated. Details of this operation are provided in more detail in FIG. 3.

Figure 8:
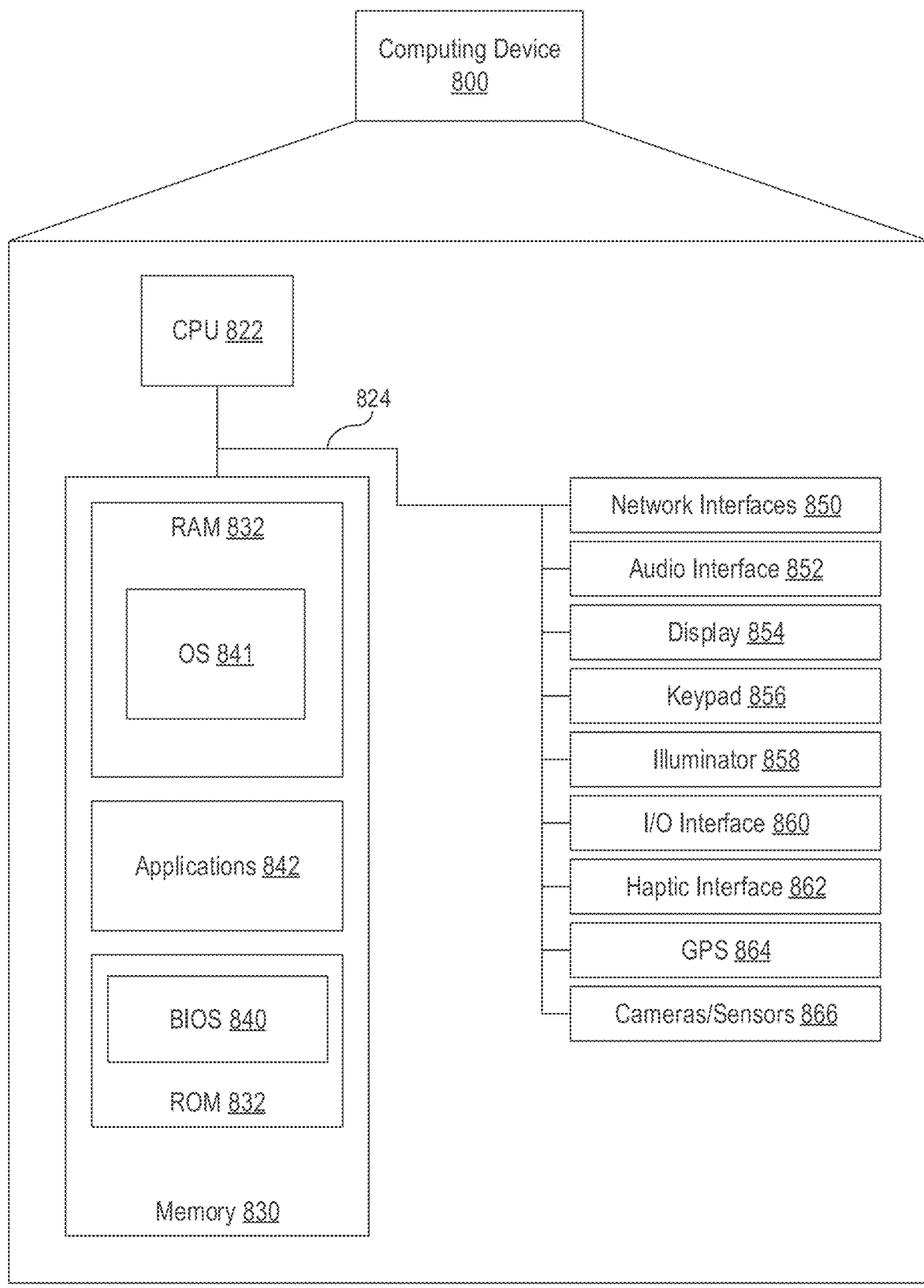
FIG. 8 is a block diagram illustrating a computing device showing an example of a client or server device used in the various embodiments of the disclosure.

FIG. 8 is a block diagram illustrating a computing device showing an example of a client or server device used in the various embodiments of the disclosure.

The device 800 may include more or fewer components than those shown in FIG. 8, depending on the deployment or usage of the device 800. For example, a server computing device, such as a rack-mounted server, may not include audio interfaces 852, displays 854, keypads 856, illuminators 858, haptic interfaces 862, Global Positioning System (GPS) receiver 864, or cameras/sensors 866. Some devices may include additional components not shown, such as graphics processing unit (GPU) devices, cryptographic coprocessors, artificial intelligence (AI) accelerators, or other peripheral devices.

As shown in FIG. 8, the device 800 includes a central processing unit (CPU) 722 in communication with a mass memory 830 via bus 824. The device 800 also includes one or more network interfaces 850, an audio interface 852, a display 854, a keypad 856, an illuminator 858, an input/output interface 860, a haptic interface 862, a global positioning system, or GPS receiver 864 and a camera(s) or other optical, thermal, or electromagnetic sensors 866. Device 800 can include one camera/sensor 866 or a plurality of cameras/sensors 866. The positioning of the camera(s)/sensor(s) 866 on the device 800 can change per device 800 model, per device 800 capabilities, and the like, or some combination thereof.

In some embodiments, the CPU 822 may comprise a general-purpose CPU. The CPU 822 may comprise a single-core or multiple-core CPU. The CPU 822 may comprise a system-on-a-chip (SoC) or a similar embedded system. In some embodiments, a GPU may be used in place of, or in combination with, a CPU 822. Mass memory 830 may comprise a dynamic random-access memory (DRAM) device, a static random-access memory device (SRAM), or a Flash (e.g., NAND Flash) memory device. In some embodiments, mass memory 830 may comprise a combination of such memory types. In one embodiment, the bus 824 may comprise a Peripheral Component Interconnect Express (PCIe) bus. In some embodiments, the bus 824 may comprise multiple busses instead of a single bus.

Mass memory 830 illustrates another example of computer storage media for the storage of information such as computer-readable instructions, data structures, program modules, or other data. Mass memory 830 stores a basic input/output system ("BIOS") 840 for controlling the low-level operation of the device 800. The mass memory also stores an operating system 841 for controlling the operation of the device 800

Applications 842 may include computer-executable instructions which, when executed by the device 800, perform any of the methods (or portions of the methods) described previously in the description of the preceding Figures. In some embodiments, the software or programs implementing the method embodiments can be read from a hard disk drive (not illustrated) and temporarily stored in RAM 832 by CPU 822. CPU 822 may then read the software or data from RAM 832, process them, and store them in RAM 832 again.

The device 800 may optionally communicate with a base station (not shown) or directly with another computing device. The one or more network interfaces 850 are sometimes referred to as a transceiver, transceiving device, or network interface card (NIC).

The audio interface 852 produces and receives audio signals such as the sound of a human voice. For example, the audio interface 852 may be coupled to a speaker and microphone (not shown) to enable telecommunication with others or generate an audio acknowledgment for some action. Display 854 may be a liquid crystal display (LCD), gas plasma, light-emitting diode (LED), or any other type of display used with a computing device. Display 854 may also include a touch-sensitive screen arranged to receive input from an object such as a stylus or a digit from a human hand.

Keypad 856 may comprise any input device arranged to receive input from a user. Illuminator 858 may provide a status indication or provide light.

The device 800 also comprises an input/output interface 860 for communicating with external devices, using communication technologies, such as USB, infrared, Bluetooth™, or the like. The haptic interface 862 provides tactile feedback to a user of the client device.

The GPS receiver 864 can determine the physical coordinates of the device 800 on the surface of the Earth, which typically outputs a location as latitude and longitude values. GPS receiver 864 can also employ other geo-positioning mechanisms, including, but not limited to, triangulation, assisted GPS (AGPS), E-OTD, CI, SAI, ETA, BSS, or the like, to further determine the physical location of the device 800 on the surface of the Earth. In one embodiment, however, the device 800 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:

1. A method comprising:
   allocating a first memory space to a function, the memory space comprising an initial amount of memory for the function and the function being one of a plurality of functions processing a big data job;
   setting the first memory space as a current memory space;
   processing data using the function, the processing comprising writing data to the current memory space;
   determining that the function requires additional memory space by monitoring that the function has exhausted its current memory space while processing;
   determining that memory usage across the plurality of functions exhibits a power-law distribution wherein a small subset of the functions consume significantly more memory than a majority of the functions;
   in response to determining that the memory usage exhibits the power-law distribution:
      allocating a new memory space based on the current memory space and a geometric growth factor, the new memory space being larger than the current memory space by a factor determined by the geometric growth factor;
      copying data in the current memory space to the new memory space;
      setting the current memory space as an old memory space;
      setting the new memory space as the current memory space; and
      not deallocating the old memory space.

2. The method of claim 1, wherein allocating a new memory space comprises computing a size of the new memory space by multiplying the current memory space by the growth factor.

3. The method of claim 2, wherein allocating a new memory space comprises repeatedly allocating memory according to a geometric progression of new memory space sizes.

4. The method of claim 3, wherein a total space consumed by a function, including non-deallocated memory spaces, comprises a geometric series sum.

5. The method of claim 2, further comprising determining that the size of the new memory space exceeds a preconfigured maximum and raising one of an exception or a flag to indicate a need for special handling.

6. The method of claim 4, further comprising executing one of a garbage collection or memory deallocation routine when terminating to reclaim all memory consumed by the function.

7. The method of claim 1, further comprising initiating a plurality of additional functions and allocating memory spaces to the plurality of additional functions based on the initial amount of memory and the growth factor.

8. A non-transitory computer-readable storage medium for tangibly storing computer program instructions capable of being executed by a computer processor, the computer program instructions defining steps of:
- allocating a first memory space to a function, the memory space comprising an initial amount of memory for the function and the function being one of a plurality of functions processing a big data job;
- setting the first memory space as a current memory space;
- processing data using the function, the processing comprising writing data to the current memory space;
- determining that the function requires additional memory space by monitoring that the function has exhausted its current memory space while processing;
- determining that memory usage across the plurality of functions exhibits a power-law distribution wherein a small subset of the functions consume significantly more memory than a majority of the functions;
- in response to determining that the memory usage exhibits the power-law distribution:
- allocating a new memory space based on the current memory space and a geometric growth factor, the new memory space being larger than the current memory space by a factor determined by the geometric growth factor;
- copying data in the current memory space to the new memory space;
- setting the current memory space as an old memory space;
- setting the new memory space as the current memory space; and
- not deallocating the old memory space.

9. The non-transitory computer-readable storage medium of claim 8, wherein allocating a new memory space comprises computing a size of the new memory space by multiplying the current memory space by the growth factor.

10. The non-transitory computer-readable storage medium of claim 9, wherein allocating a new memory space comprises repeatedly allocating memory according to a geometric progression of new memory space sizes.

11. The non-transitory computer-readable storage medium of claim 10, wherein a total space consumed by a function, including non-deallocated memory spaces, comprises a geometric series sum.

12. The non-transitory computer-readable storage medium of claim 9, the steps further comprising determining that the size of the new memory space exceeds a preconfigured maximum and raising one of an exception or a flag to indicate a need for special handling.

13. The non-transitory computer-readable storage medium of claim 11, the steps further comprising executing one of a garbage collection or memory deallocation routine when terminating to reclaim all memory consumed by the function.

14. The non-transitory computer-readable storage medium of claim 8, the steps further comprising initiating a plurality of additional functions and allocating memory spaces to the plurality of additional functions based on the initial amount of memory and the growth factor.

15. A device comprising:
a processor configured to:
- allocate a first memory space to a function, the memory space comprising an initial amount of memory for the function and the function being one of a plurality of functions processing a big data job;
- set the first memory space as a current memory space;
- process data using the function, the processing comprising writing data to the current memory space;
- determine that the function requires additional memory space by monitoring that the function has exhausted its current memory space while processing;
- determine that memory usage across the plurality of functions exhibits a power-law distribution wherein a small subset of the functions consume significantly more memory than a majority of the functions;
- in response to determining that the memory usage exhibits the power-law distribution:
- allocate a new memory space based on the current memory space and a geometric growth factor, the new memory space being larger than the current memory space by a factor determined by the geometric growth factor;
- copy data in the current memory space to the new memory space;
- set the current memory space as an old memory space;
- set the new memory space as the current memory space; and
- not deallocate the old memory space.

16. The device of claim 15, wherein allocating a new memory space comprises computing a size of the new memory space by multiplying the current memory space by the growth factor.

17. The device of claim 16, wherein allocating a new memory space comprises repeatedly allocating memory according to a geometric progression of new memory space sizes.

18. The device of claim 17, wherein a total space consumed by a function, including non-deallocated memory spaces, comprises a geometric series sum.

19. The device of claim 17, further comprising executing one of a garbage collection or memory deallocation routine when terminating to reclaim all memory consumed by the function.

20. The device of claim 15, further comprising initiating a plurality of additional functions and allocating memory spaces to the plurality of additional functions based on the initial amount of memory and the growth factor.

* * * * *